Oct. 27, 1964   P. J. ALLEN   3,154,784
RE-RADIATING ANTENNA DEVICE
Filed Dec. 30, 1960
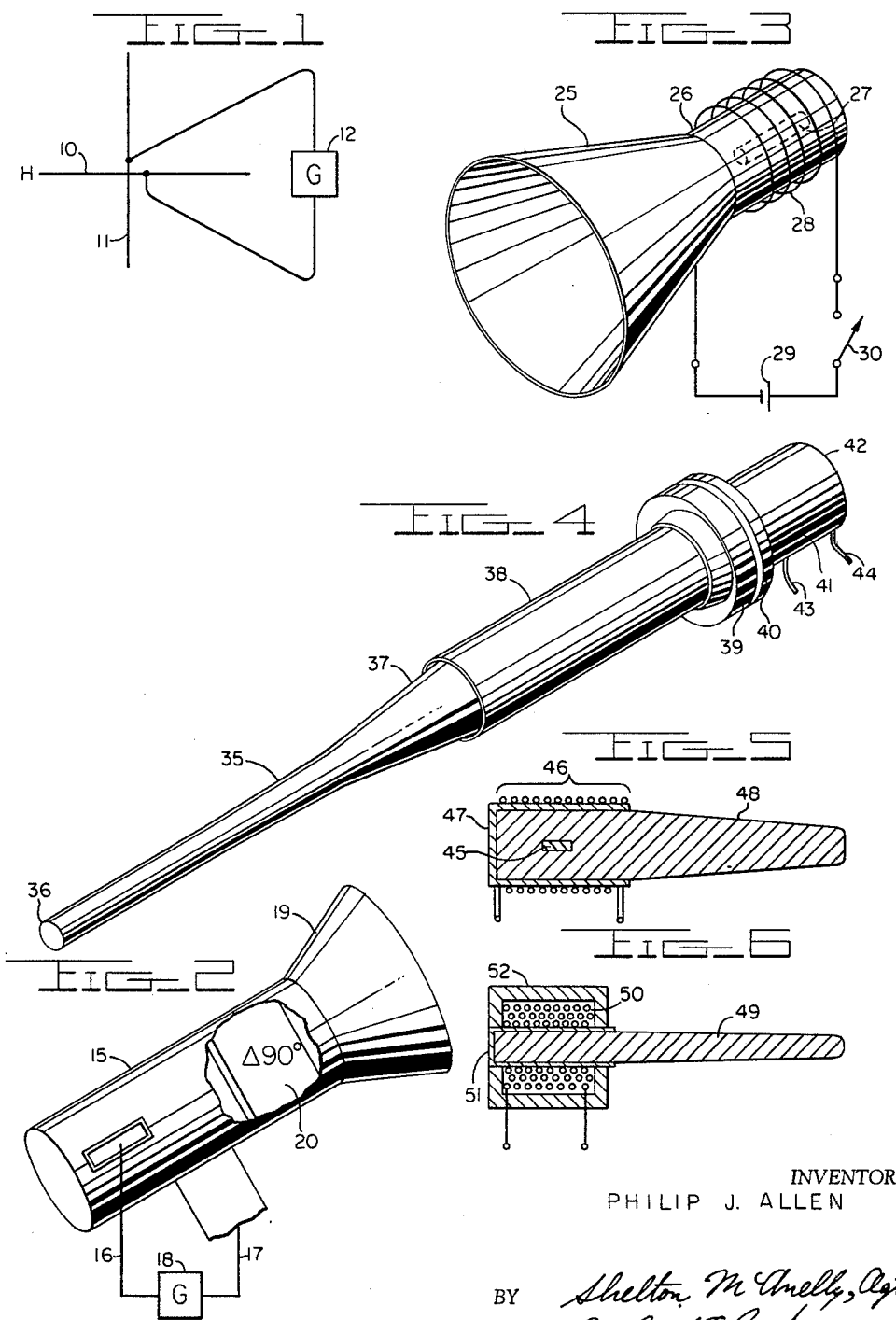
INVENTOR
PHILIP J. ALLEN
BY Shelton M Snelly, Agt
Richard C Reed
ATTORNEY

United States Patent Office 3,154,784
Patented Oct. 27, 1964

3,154,784
RE-RADIATING ANTENNA DEVICE
Philip J. Allen, 8000 Marion St., North Forestville, Md.
Filed Dec. 30, 1960, Ser. No. 79,934
5 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

This invention relates to electromagnetic wave reflector devices in general and in particular to reflector devices capable of providing control over the relationship of polarization of a reflected wave relative to the polarization of the incident wave causing such reflected wave.

In many applications of electromagnetic wave devices it is desirable to produce an apparatus which is capable of providing a return of energy toward a distant signal source. Such return could be discussed as occurring by any of a number of different processes, being called reflection for example, or reradiation, or back scattering, but in any event the particular end result is the alteration of the direction of propagation of an electromagnetic wave in such a manner that energy resultant therefrom or a part of the energy thereof is caused to travel in a direction different from that in which it originally propagated. Such a direction alteration can be of various amounts and of various percentage of the incident energy, however for purposes of the present discussion as well as in the majority of situations where such devices would find application the alteration is in effect a reversal of the direction of propagation such that a signal traveling to a second point from a first point is caused to return at least in part to the point of origin. A corner reflector is an example of a well known reflector device by means of which energy is returned to a desired locality. A typical application of such a corner reflector is with a radar system in which it is desired to obtain enhanced signal return characteristics from a device such as a wooden vessel which would inherently have rather poor return characteristics for electromagnetic wave energy. Such a corner reflector, although it is capable of producing return of electromagnetic energy, is not of such configuration as will in itself normally permit any control or variation in the polarization characteristics thereof. Thus when such a device is employed with linearly polarized radiation, it will normally return energy with the same plane of polarization. Additionally the corner reflector has indefinite properties as to its effect on polarization of the return signal depending at least in part on the direction of incidence of energy thereon. In some instances however, it may be desirable that a reflector be available which will always have a selected effect on polarization relationship between incident and return energy. The selected effect can be fixed or variable in discontinuous steps as by the off-on operation of a switch device or smoothly variable over a range as in modulation with a variable impedance device depending on the specific characteristics desired.

It is accordingly an object of the present invention to provide an electromagnetic wave energy return device in which control of the polarization of the return electromagnetic wave energy is possible.

Another object of the present invention is to provide an electromagnetic wave energy return device in which the plane of polarization of return energy is orthogonal to the plane of polarization of the incident signal.

Another object of the present invention is to provide an electromagnetic wave return device which will return a wave always having a polarization orthogonal to the polarization of an incident wave.

Another object is to provide a passive communication device.

Another object is to provide a passive electromagnetic wave reflector device capable of imparting information containing modulation upon a return signal.

Another object of the present invention is to provide a return device for electromagnetic wave energy in which the polarization relative to the incident energy can be controlled according to a prearranged sequence.

Other objects and many of the attendant advantages of this invention will be readily appreciated as the same becomes better understood by reference to the following detailed description when considered in connection with the accompanying drawings wherein:

FIGS. 1 and 2 show partly in schematic form representation of dual mode transducer devices capable of returning energy having a different polarization from incident energy. More specifically, FIG. 1 shows a dual antenna with orthogonally disposed linear elements whereas FIG. 2 shows a circular polarization device, however neither is limited specifically to operation with linearly polarized waves or circularly polarized waves.

FIG. 3 shows a transducer device which is related to the devices of FIGS. 1 and 2 except that variable return characteristics are possible.

FIGS. 4, 5 and 6 show variations of the apparatus of FIG. 3 employing different forms of space coupling devices and polarization control devices.

In accordance with the basic teachings of the present invention a reflector device is provided for use with electromagnetic waves wherein control over the polarization of return waves is made possible by employing a wave coupling transducer with two ports coupling therethrough to orthogonal polarizations in a selected medium, such as space, the two ports being additionally coupled through a nonreciprocal element having differential phase shift properties.

With reference now to FIG. 1 of the drawing the apparatus shown therein is a basic illustration of the principles of the present invention including two antenna elements or dipoles 10 and 11 oriented at right angular relationship and interconnected by means of a differential phase shifter device labeled G and further identified by the numeral 12 which in certain specific embodiments may take the form of a gyrator which is a specific device of that general class characterized by a differential phase shift of 180°. As the term differential phase shift is used it is in reference to a two-way transmission device wherein the signal passing one way therethrough experiences a phase shift which differs from that experienced by the signal passing the other way, such difference being expressed in electrical degrees. With the apparatus of FIG. 1 if the polarization of the wave incident upon the crossed dipoles 10 and 11 is vertical linear the echo signal returned in the direction of incidence by the apparatus, which may be termed back scattered signal, will be of horizontal polarization. On the other hand, if the incident signal is horizontally polarized the back scattered signal will be vertically polarized. Furthermore, if an incident wave is circularly polarized in one sense, the back scattered signal will be circularly polarized in the opposite sense, while an incident elliptically polarized signal will be back scattered with opposite sense and a change in the orientation of the major axis through an angle of 90°.

In FIG. 2 an apparatus is indicated more or less schematically which is basically a circular polarized antenna having two ports which are connected to a gyrator such as an appropriate nonreciprocal ferrite device. The dual mode antenna contains a two mode transducer indicated in general by the numeral 15 having the orthogonally related ports 16 and 17 shown schematically, the ports 16 and 17 being connected through gyrator G indicated by numeral 18. The dual mode transducer 15 is coupled to space by means of a conical horn device 19 through a section of waveguide which contains a quarter wave plate 20. This quarter wave plate 20 is disposed in the waveguide at a symmetrical angle relative to the ports 16 and 17. It should be borne in mind that FIG. 2 is a specific form of antenna rather than a specific requirement of the invention because various arrangements and modifications thereof may be made without exceeding the basic scope of the invention. As an example, it is possible to obtain utility of some form as to polarization control if the quarter wave plate 20 is not included in the apparatus. Like the apparatus of FIG. 1 the apparatus of FIG. 2 will back scatter a signal which is polarized orthogonal to that of the incident signal.

While the apparatus of FIG. 1 is generally more desirable for lower radio frequency operation, and the apparatus of FIG. 2 generally more suitable for somewhat higher frequencies of operation, operation in the microwave region, although possible with both FIG. 1 and FIG. 2, achieves a particularly simple configuration with the apparatus of FIG. 3 which contains a Faraday rotator located in a short circuited section of a waveguide which can support two orthogonally polarized components. This rotator acts as a gyrator if the one way rotation is 45°, however, broadly desirable results can be obtained with other rotation magnitudes. The waveguide itself might be dominant mode circular waveguide, square waveguide or ridged waveguide, as appropriate for the particular application desired. Structurally the apparatus of FIG. 3 contains a conical horn 25 to which is connected a section of circular waveguide 26 within which is disposed a ferrite member 27 and about which is placed a suitable magnetizing coil 28 through which a current may be passed in response to the battery 29 and switch 30. It is to be understood that the switch 30 may be an impedance device variable at a desired rate, such as an audio frequency, by means of which desired modulation characteristics may be imparted to the device. In operation of this apparatus, radio frequency energy impinging upon the open end of the conical horn 25 propagates through the horn 25 and into the circular waveguide 26 which is short circuited at the opposite end thereof causing a reversal in the direction of propagation of the intercepted energy and reemission from the open end of the conical horn 25. The ferrite member 27 acting under the influence of the magnetic field, and proportioned to be a 45° Faraday rotator, functions as a gyrator because the wave traverses it twice. In keeping with other parts of the discussion, the device of FIG. 3 may be considered as having two orthogonal ports in the region of the junction of horn 25 and waveguide 26. With this device broad frequency operation is possible when the Faraday rotator is of such configuration as to maintain constant its one-way rotation independent of operating frequency. As a variation, wide banding of the device can be obtained using quadruple ridged waveguide. As a further variation, the magnetic biasing field could be provided by a suitable permanent magnet arrangement rather than the electromagnetic device indicated in FIG. 3. However, the electromagnetic device has certain advantages in that it is capable of flexibility of operation by switch 30 so that Faraday rotation is obtained with the magnetic field excited or is not obtained with the switch 30 in the open position or can be modulated to some intermediate condition as noted above. Such a variation could provide the device with certain modulation capabilities which could be used for communication or identification purposes by programming or modulating the gyrator element in an appropriate manner.

With reference now to FIG. 4 of the drawings, the apparatus shown therein is an artists sketch of a typical embodiment of the features of the present invention proportioned for the production of a return wave whose polarization is orthogonal to the polarization of the incident wave. Although this representation of FIG. 4 is an outside view, the apparatus thereof may be basically similar internally to cross-sectional representations of FIGS. 5 and 6 and correspondence to port terminology may be facilitated by realizing that it does in fact have two orthogonal ports existing for example at the open end of the Faraday rotator. The apparatus of FIG. 4 contains a dielectric rod radiator 35 which is proportioned in size to obtain desired characteristics typically being indicated here as having an end 36 diameter which is less than that of the diameter in another region 37. The dielectric rod 35 extends into a cylindrical member which constitutes a waveguide identified by the numeral 38. At the other end of member 38 a pair of flanges or the like is indicated by the numerals 39 and 40 to facilitate assembly. Beyond the flanges 39 and 40 is indicated a second cylindrical appearing section 41 which is capped at the far end 42 thereof by a suitable short circuit closure device to form a shorted waveguide end. In the apparatus of FIG. 4 the waveguide section 38 is inserted mainly for convenience with the Faraday rotator apparatus discussed in connection with FIG. 3 being located within the section 41 with suitable leads 43 and 44 being brought out for electrical connection to the device when the electromagnetic form of magnetic field producing device is employed. In a typical arrangement of an apparatus in accordance with FIG. 4 the dielectric rod 35 continues substantially to the short circuited end 42. Disposed within the portion thereof in the region of 41 is a small cylinder of ferrite material which under the influence of a suitable magnetic biasing field constitutes a Faraday rotator of the typical 45° one-way rotation as in the apparatus of FIG. 3.

Reference to FIG. 5 for the moment will indicate in general the location of this ferrite element which corresponds to the component indicated by the numeral 45 in FIG. 5. The apparatus of FIG. 4 which may contain a suitable electromagnetic field producing means such as a coil is completely self-contained within the confines of the cylinder member 41 which may have an outer cover portion thereof so that the coils or whatever they may be are protected from mechanical or other damage. Again reference to FIG. 5 will indicate in general the placement of a magnetic field producing coil 46 upon the suitable form member 47. Such an arrangement could typically be used in the apparatus of FIG. 4 if desired. The operation of the apparatus of FIG. 4 is substantially the same as that of FIG. 3 with the apparatus providing the particular radiation characteristics dictated by the dielectric rod 35. Thus the apparatus is an omnipolarization sensitive device which can be controlled by the proper proportionment of the magnetic field to obtain Faraday rotation action which in this embodiment is typically 45 degrees in each direction and is cumulative so that there is an orthogonal polarization relationship between the incident signals upon the end 36 of dielectric rod 35 and the return signals emanating from the end 36.

Reference is now directed to FIG. 5 which has already been partially described in details similar to those of preceding figures and which shows a simplified structural arrangement of apparatus similar to FIG. 4 containing a dielectric rod 48 which leads directly to a Faraday rotator assembly containing a ferrite element 45, magnetic field producing means 46 and the form 47 supporting such field producing means which may contain conductive material as an integral or separate part thereof to form a waveguide enveloping the large diameter end of the dielectric rod 48. The operation of the apparatus of FIG. 5 is substantially that previously described for FIG. 4 with the advantage thereof being a somewhat more compact structure.

Where even greater compactness is desired an arrangement such as that of FIG. 6 has advantages. In this device a rod antenna is employed and identified by the numeral 49 but rather than being of the previously typified dielectric type it is of a ferrite containing type and acts as a combined rod antenna and Faraday rotator. The similarity in operation to that of the previously described FIG. 5 as well as to the structure of FIG. 4 is quite apparent with the rod member 49 itself acting as a Faraday rotator in the region thereof which is magnetically biased by means of a suitable solenoid coil 50 which is disposed upon a suitable form member 51, being as in the apparatus of FIG. 5 in effect a short section of circular waveguide short circuited at one end and open at the other where the location of two orthogonal ports may be visualized to allow the insertion of the rod member 49. To provide for concentration of the field of the coil 50, the entire coil arrangement is enclosed within a suitable annular member 52 of material of high permeability which concentrates the magnetic field within the portion of the rod extending into the circular waveguide region and also provides mechanical protection for the coil 50. Again the operation of the apparatus of FIG. 6 is believed apparent in its relationship to the previously described FIGS. 4 and 5 with the Faraday rotator portion being typically proportioned to provide cumulative 45° rotation for each passage of energy therethrough, two passes being obtained as a result of the short circuit termination so that energy incident in the right hand end of the showing of FIG. 6 reaches the left hand end of the rod 49 and is reflected for reradiation or back scattering at the right hand end of rod 49.

Obviously many modifications and variations of the present invention are possible in the light of the above teachings, for example in some instances it might be desirable to include a suitable two-way amplifier in the gyrators 12 and 18. It is therefore to be understood that within the scope of the appended claims the invention may be practiced otherwise than as specifically described.

What is claimed is:

1. In a polarized wave energy operative device, a transducer having two ports for coupling to spatially coincident fields having orthogonal polarization relationship in a propagation medium, a differential phase shift device, and means for connecting said ports through said device.

2. In a polarized wave energy operative device, a pair of dipole antennas disposed at right angles to each other, and located so as to have substantial coincidence in the effective center of the radiation thereof, a differential phase shift device, and means including said device for interconnecting the two antennas.

3. In a polarized wave energy operative device, a dual mode transducer having two ports coupling to spatially coincident fields having orthogonal polarization relationship therein, means for coupling said ports to a propagation medium, a differential phase shift device, and means for connecting said ports through said device.

4. In a polarized wave energy operative device, a dual mode transducer having two ports coupling to orthogonal polarizations therein, means for coupling said ports to a propagation medium, with coincident fields for the ports, a quarter wave plate disposed in said means for coupling oriented symmetrically relative to the ports, a differential phase shift device, and means for connecting said ports through said device.

5. In a polarized wave energy operative device, a rod antenna, and a short circuited Faraday rotator having 45 degree rotation per single passage therethrough connected to said rod antenna whereby electromagnetic wave energy picked-up by said rod antenna is delivered to said Faraday rotator, rotated 90 degrees, and redelivered to the rod antenna for reradiation thereby.

References Cited in the file of this patent

UNITED STATES PATENTS

| | | |
|---|---|---|
| 2,461,310 | Southworth | Feb. 8, 1949 |
| 2,544,677 | Hammond et al. | Mar. 13, 1951 |
| 2,582,310 | Chireix | Jan. 15, 1952 |
| 2,748,353 | Hogan | May 29, 1956 |
| 2,850,728 | Wright et al. | Sept. 2, 1958 |
| 2,863,144 | Herscovici et al. | Dec. 2, 1958 |

OTHER REFERENCES

Sakiotis: Microwave—Antenna Ferrite Application; Electronics, June 1952, pp. 156, 158, 162 and 166.